(12) United States Patent
Ruan

(10) Patent No.: US 12,186,149 B1
(45) Date of Patent: Jan. 7, 2025

(54) ELECTRIC TOOTHBRUSH HEAD

(71) Applicant: Qiang Ruan, Gaozhou (CN)

(72) Inventor: Qiang Ruan, Gaozhou (CN)

( * ) Notice: Subject to any disclaimer, the term of this patent is extended or adjusted under 35 U.S.C. 154(b) by 0 days.

(21) Appl. No.: 18/658,321

(22) Filed: May 8, 2024

(51) Int. Cl.
| | |
|---|---|
| A61C 17/34 | (2006.01) |
| A46B 13/00 | (2006.01) |
| A46B 13/02 | (2006.01) |
| A61C 17/26 | (2006.01) |

(52) U.S. Cl.
CPC ........ *A61C 17/3436* (2013.01); *A46B 13/008* (2013.01); *A46B 13/02* (2013.01); *A61C 17/26* (2013.01)

(58) Field of Classification Search
CPC ....... A61C 17/222; A61C 17/32; A61C 17/34; A61C 17/3409; A61C 17/3436; A61C 17/3472; A61C 17/3445; A46B 13/008; A46B 13/02
See application file for complete search history.

(56) References Cited

U.S. PATENT DOCUMENTS

| | | | | |
|---|---|---|---|---|
| 4,420,851 A | * | 12/1983 | Wiener | A61C 17/26 477/7 |
| 8,220,097 B2 | * | 7/2012 | DePuydt | A61C 17/32 15/22.4 |
| 2005/0081315 A1 | * | 4/2005 | Kwong | A61C 17/3436 15/28 |
| 2013/0025079 A1 | * | 1/2013 | Jungnickel | A61C 17/3436 15/22.1 |
| 2018/0014922 A1 | * | 1/2018 | Wang | A61C 17/224 |
| 2020/0078152 A1 | * | 3/2020 | Wada | A61C 17/34 |

FOREIGN PATENT DOCUMENTS

| | | | |
|---|---|---|---|
| CN | 205322533 U | | 6/2016 |
| CN | 206355171 U | | 7/2017 |
| CN | 218356435 U | * | 1/2023 |
| CN | 116712201 A | | 9/2023 |
| CN | 220459446 U | | 2/2024 |
| WO | WO-1994003125 A1 | * | 2/1994 |
| WO | WO-2004028293 A1 | * | 4/2004 ......... A46B 15/0002 |
| WO | 2023201776 A1 | | 10/2023 |

OTHER PUBLICATIONS

Translation of CN-218356435-U (Year: 2024).*

* cited by examiner

*Primary Examiner* — Edward F Landrum
*Assistant Examiner* — Sarah Akyaa Fordjour

(57) ABSTRACT

An electric toothbrush head, including: a housing, wherein the housing is provided with a mounting cavity and a mounting hole communicated with the mounting cavity; a transmission assembly, wherein the transmission assembly is arranged in the mounting cavity and comprises a first transmission rod, a second transmission rod and a third transmission rod, one end of the first transmission rod, one end of the second transmission rod and one end of the third transmission rod are rotatably connected through a rotating shaft, and the other end of the third transmission rod is hinged in the mounting cavity; and a cleaning head, wherein the cleaning head is rotatably mounted in the mounting cavity from the mounting hole, a bottom of the cleaning head is eccentrically provided with a first rotating groove, and another end of the second transmission rod is arranged in the first rotating groove.

20 Claims, 10 Drawing Sheets

ELECTRIC TOOTHBRUSH HEAD

TECHNICAL FIELD

The present invention relates to the technical field of daily necessities, and in particular, to an electric toothbrush head.

BACKGROUND

An electric toothbrush head is a cleaning accessory mounted on an electric toothbrush and cleaning teeth by rotating back and forth at a high speed. Specifically, the electric toothbrush drives a transmission assembly to move through a drive mechanism, and then drives a cleaning head of the electric toothbrush head to rotate at a high speed, so that an effective cleaning effect is provided.

In the prior art, the transmission between the drive mechanism and the electric toothbrush head is usually achieved by directly providing a movable connecting rod for power transmission. However, this structure causes the transmission assembly to lack stable support and guidance; consequently, the electric toothbrush head shakes irregularly in the movement process, the transmission force cannot be uniformly transmitted to the cleaning head of the electric toothbrush head, and the instability of movement of the electric toothbrush head is caused.

SUMMARY

A primary objective of the present invention is to provide an electric toothbrush head, which aims to design a stable supporting and guiding structure, so that irregular shaking of a transmission assembly in the power transmission process is solved, and the movement stability of the electric toothbrush head is improved.

To achieve the above objective, the present invention provides an electric toothbrush head. The electric toothbrush head comprises: a housing, wherein the housing is provided with a mounting cavity and a mounting hole communicated with the mounting cavity; a transmission assembly, wherein the transmission assembly is arranged in the mounting cavity and comprises a first transmission rod, a second transmission rod and a third transmission rod, one end of the first transmission rod, one end of the second transmission rod and one end of the third transmission rod are rotatably connected through a rotating shaft, and the other end of the third transmission rod is hinged in the mounting cavity; and a cleaning head, wherein the cleaning head is rotatably mounted in the mounting cavity from the mounting hole, a bottom of the cleaning head is eccentrically provided with a first rotating groove, and one end of the second transmission rod away from the first transmission rod is arranged in the first rotating groove.

Optionally, an inner wall of the mounting cavity is provided with a first limiting post, and an end portion of the third transmission rod is provided with a first fixed hole rotatably mounted with the first limiting post.

Optionally, the second transmission rod is provided with a second limiting post, and the second limiting post is positioned in the first rotating groove.

Optionally, the inner wall of the mounting cavity is further provided with a third limiting post, a second rotating groove rotatably connected to the third limiting post is formed in the bottom of the cleaning head, and the second rotating groove is positioned at a rotation center of the cleaning head.

Optionally, the first transmission rod is provided with a movable portion, the movable portion is provided with a movable groove, the second transmission rod is inserted into the movable groove, and the third transmission rod is arranged outside the movable portion.

Optionally, two opposite sides of the movable portion are provided with first shaft holes, one end of the second transmission rod far away from the second limiting post is provided with a second shaft hole, one end of the third transmission rod far away from the first limiting post is provided with a third shaft hole, and the rotating shaft penetrates through the first shaft holes, the second shaft hole and the third shaft hole.

Optionally, the first transmission rod comprises a first push rod and a second push rod fixedly connected to the first push rod, one end of the second push rod far away from the first push rod is rotatably connected to the second transmission rod and the third transmission rod, and an included angle between the first push rod and the second push rod is an obtuse angle.

Optionally, an included angle between the second push rod and the third transmission rod is greater than an included angle between the second transmission rod and the third transmission rod.

Optionally, an included angle between the second push rod and the third transmission rod is less than an included angle between the second transmission rod and the third transmission rod.

Optionally, the cleaning head comprises a rotating base and bristles arranged on the rotating base, the rotating base is rotatably mounted in the mounting cavity, the bristle is arranged on one side of the rotating base away from the mounting cavity, the rotating base is convexly provided with a mounting seat, an avoidance groove is formed in an eccentric position of the mounting seat, and the first rotating groove is formed on an inner wall of the avoidance groove.

Optionally, the electric toothbrush head further comprises a limiting bolt, the housing is provided with a second fixed hole, a side wall of the mounting seat is provided with a limiting groove, and the limiting bolt extends into the limiting groove from the second fixed hole.

Optionally, the electric toothbrush head further comprises a shock absorbing pad, the shock absorbing pad is arranged in the mounting cavity, and a top of the shock absorbing pad abuts against an outer wall of the second transmission rod.

Optionally, a metal sleeve is sleeved on the second limiting post.

Optionally, a connecting member engaged with a drive shaft of the electric toothbrush is arranged on the first transmission rod, one end of the first transmission rod far away from the second transmission rod is provided with a connecting seat, and the connecting seat is configured to mount the connecting member.

Optionally, a spring is sleeved on an outer side of the first transmission rod, the mounting cavity is provided with a spring seat, and the spring is positioned between the spring seat and the connecting seat.

Optionally, the connecting member comprises a soft rubber suction disk.

Optionally, the connecting member comprises a soft rubber ball disk.

Optionally, the transmission assembly further comprises a magnetic member magnetically engaged with the drive shaft of the electric toothbrush, and the magnetic member is fixedly arranged at one end of the first transmission rod far away from the second transmission rod.

Optionally, the magnetic member is a screw, and the first transmission rod is provided with a screw hole adapted to the screw.

Optionally, the electric toothbrush head further comprises a tail hood, and the tail hood is detachably connected to the housing.

The present invention has the beneficial effects that: the first transmission rod reciprocates along a length direction of the housing to drive the second transmission rod and the third transmission rod to synchronously move, and meanwhile the second transmission rod rotates under the action of the rotating shaft, so that the cleaning head is driven to rotate back and forth in an arc shape. In addition, since one end of the third transmission rod is constrained on the housing, when one end of the third transmission rod connected to the rotating shaft moves along with the first transmission rod, the other end of the third transmission rod provides a pulling force for the second transmission rod to ensure that the second transmission rod keeps stably stressed in the movement process, which effectively avoids irregular swing radian and frequency of the cleaning head, and further improves the movement stability of the electric toothbrush head.

BRIEF DESCRIPTION OF DRAWINGS

To more clearly illustrate the technical solutions in the embodiments of the present invention or in the prior art, the drawings required to be used in the description of the embodiments or the prior art are briefly introduced below. It is obvious that the drawings in the description below are some embodiments of the present invention, and those of ordinary skill in the art can obtain other drawings according to the structures illustrated in these drawings without creative efforts.

DESCRIPTIONS OF REFERENCE NUMERALS

Figure 1:
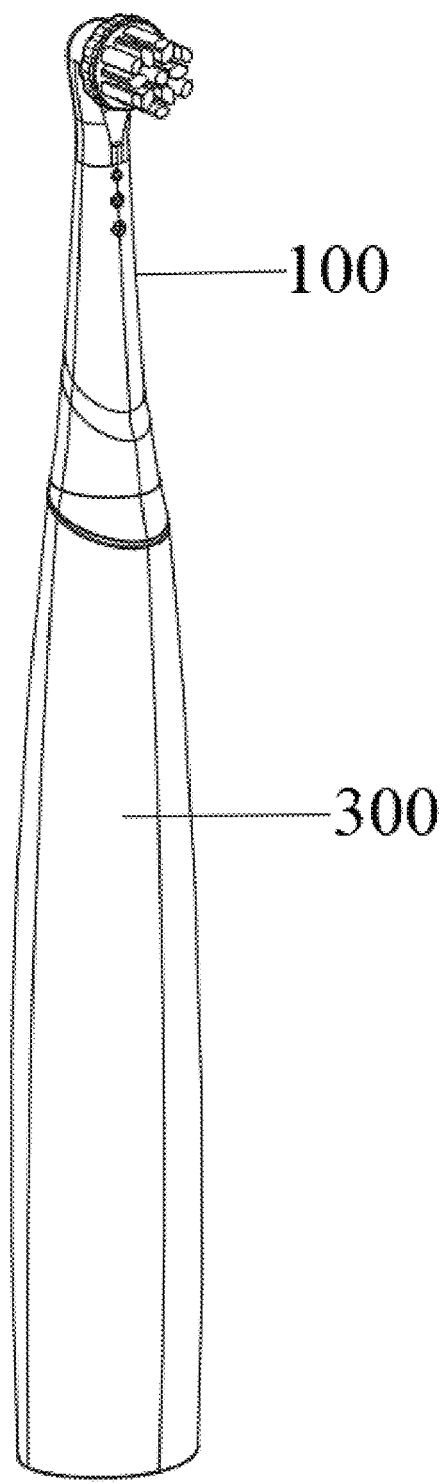
FIG. 1 is a schematic diagram of an overall structure of an electric toothbrush head when assembled in an electric toothbrush according to an embodiment of the present invention.
Figure 2:
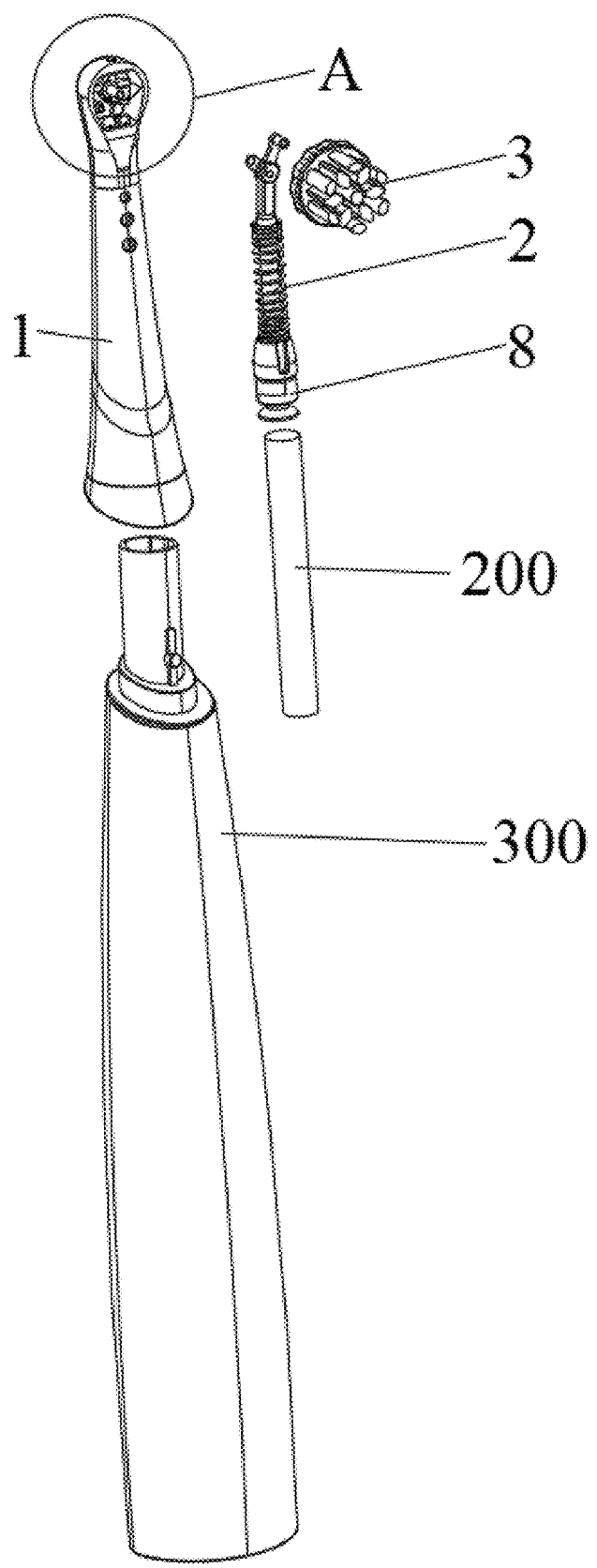
FIG. 2 is a schematic diagram of an exploded structure of an electric toothbrush according to an embodiment of the present invention.
Figure 3:
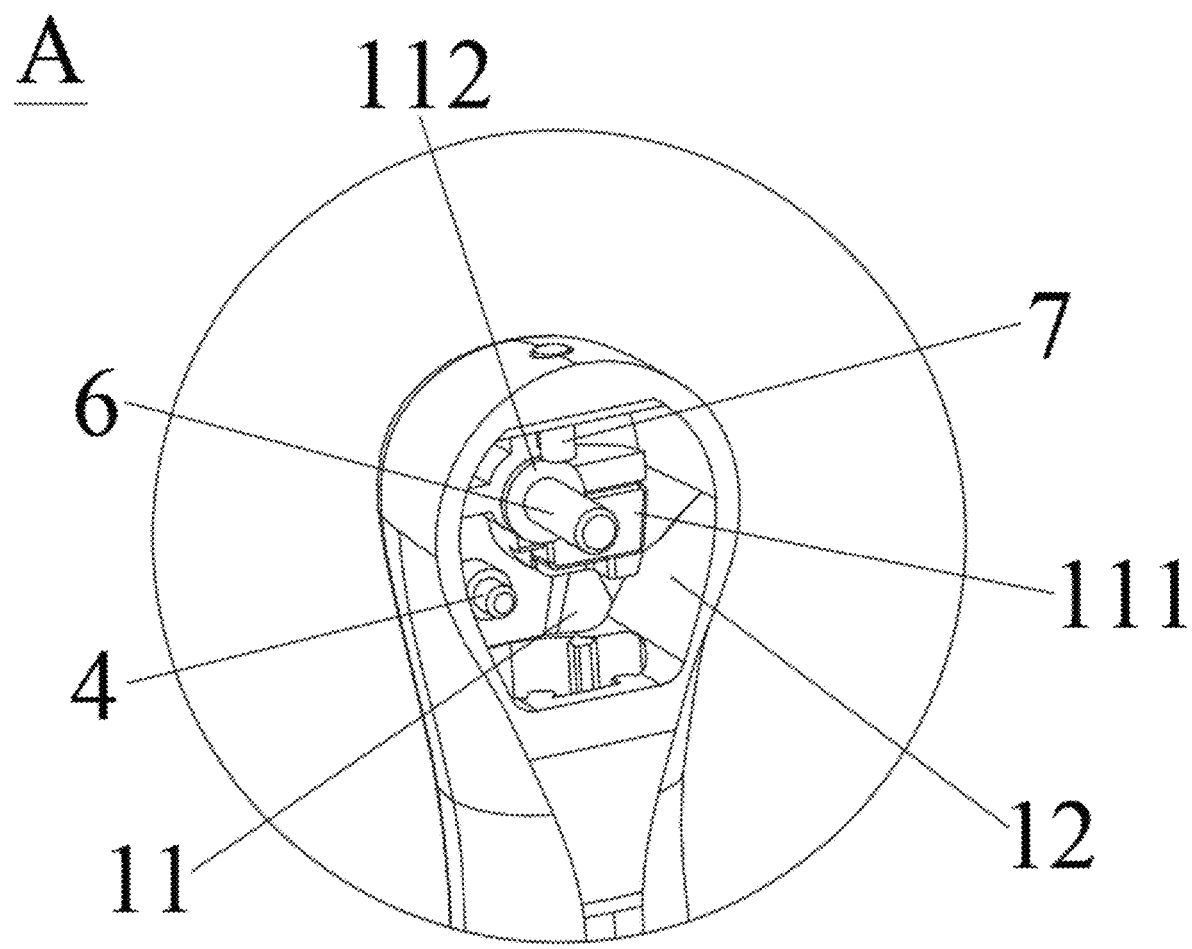
FIG. 3 is an enlarged view of a partial structure of A in FIG. 2.
Figure 4:
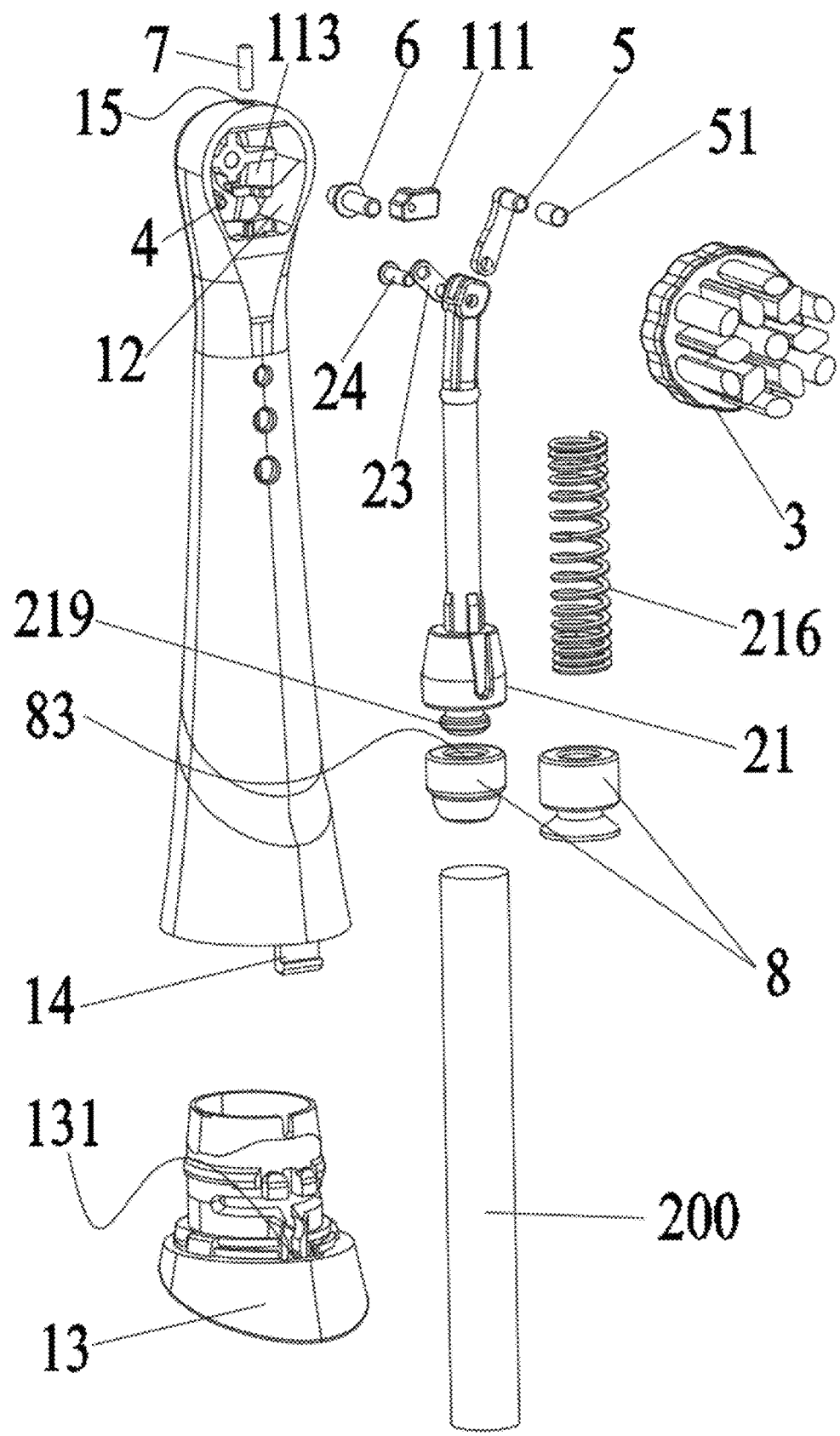
FIG. 4 is a schematic diagram of an exploded structure of an electric toothbrush head according to an embodiment of the present invention.

100: electric toothbrush head; 200: drive mechanism; 300: handle; 301: clamping protrusion;
1: housing; 11: mounting cavity; 111: shock absorbing pad; 112: spring seat; 113: accommodating groove; 12: mounting hole; 13: tail hood; 131: clamping groove; 132: clamping hole; 14: buckle; 15: second fixed hole;
2: transmission assembly; 21: first transmission rod; 211: movable portion; 212: movable groove; 213: first push rod; 214: second push rod; 215: connecting seat; 216: spring; 217: screw hole; 218: first shaft hole; 219: protrusion; 22: second transmission rod; 221: second shaft hole; 23: third transmission rod; 231: first fixed hole; 232: third shaft hole; 24: rotating shaft;
3: cleaning head; 31: rotating base; 32: bristle; 33: mounting seat; 331: first rotating groove; 332: second rotating groove; 333: avoidance groove; 334: limiting groove;
4: first limiting post; 5: second limiting post; 51: metal sleeve; 6: third limiting post; 7: limiting bolt; 8: connecting member; 81: soft rubber ball disk; 82: soft rubber suction disk; 83: groove; and 9: magnetic member.

The realization of the objectives, the functional features, and the advantages of the present invention will be further explained in conjunction with the embodiments and with reference to the drawings.

DETAILED DESCRIPTION OF EMBODIMENTS

The following clearly and completely describes the technical solutions in the embodiments of the present invention with reference to drawings in the embodiments of the present invention. It is clear that the described embodiments are merely a part rather than all of the embodiments of the present invention. All other embodiments obtained by those of ordinary skill in the art based on embodiments of the present invention without creative efforts shall fall within the protection scope of the present invention.

It should be noted that, if directional indications (such as upper, lower, left, right, front and rear) are involved in the embodiments of the present invention, the directional indications are only used to explain the relative positional relationships, the motion situations and the like between individual components under a certain pose (as shown in the drawings), and if the certain pose is changed, the directional indications are changed accordingly.

In addition, if there are descriptions relating to "first", "second" and the like in the embodiments of the present invention, the descriptions of "first", "second" and the like are for descriptive purposes only and are not to be construed as indicating or implying relative importance thereof or implicitly indicating the quantities of the indicated technical features. Thus, a feature defined by "first" or "second" may explicitly or implicitly include at least one such feature. In addition, "and/or" appearing herein is meant to include three parallel solutions, and taking "A and/or B" as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such a combination of the technical solutions should not be considered to exist, and is not within the protection scope of the present invention.

Referring to FIGS. 1 to 10, the present invention provides an electric toothbrush head 100. The electric toothbrush head 100 comprises: a housing 1, wherein the housing 1 is provided with a mounting cavity 11 and a mounting hole 12 communicated with the mounting cavity 11; a transmission assembly 2, wherein the transmission assembly 2 is arranged in the mounting cavity 11, the transmission assembly 2 comprises a first transmission rod 21, a second transmission rod 22 and a third transmission rod 23, one end of the first transmission rod 21, one end of the second transmission rod 22 and one end of the third transmission rod 23 are rotatably connected through a rotating shaft 24, and the other end of the third transmission rod 23 is hinged in the mounting cavity 11; and a cleaning head 3, wherein the cleaning head 3 is rotatably mounted in the mounting cavity 11 from the mounting hole 12, a bottom of the cleaning head 3 is eccentrically provided with a first rotating groove 331, and one end of the second transmission rod 22 away from the first transmission rod 21 is arranged in the first rotating groove 331.

Specifically, the electric toothbrush head 100 is mounted on an electric toothbrush, and the electric toothbrush at least comprises a drive mechanism 200 for driving the first transmission rod 21 on the electric toothbrush head 100 to reciprocate up and down; in addition, the electric toothbrush head further comprises a handle 300 for accommodating the drive mechanism 200 and mounting the electric toothbrush head 100. The drive mechanism 200 is well known in the art and is not limited herein. In an example, the drive mechanism 200 may transmit power by using a magnetic principle, and the drive mechanism 200 based on the magnetic principle usually controls an internal magnet to engage with a magnetic component on the electric toothbrush head 100 by using a built-in small direct current motor. When the motor rotates, the power can be transmitted to the transmission assembly 2 in the electric toothbrush head 100 through a magnetic action, so that the transmission assembly reciprocates up and down, and the cleaning head 3 is driven to rotate under the action of the transmission assembly 2, thereby achieving the cleaning action. In another example, the drive mechanism 200 may also be directly in a form of a motor and a push-pull rod, and the push-pull rod is driven by the motor to move linearly, so as to drive the transmission assembly 2 in the electric toothbrush head 100 to reciprocate up and down.

The housing 1 is configured to accommodate the remaining structures of the electric toothbrush head 100. The shapes of the housing 1, the mounting cavity 11 and the mounting hole 12 are not subject to excessive limitations, as long as a mounting space is reserved for the remaining structures. The mounting cavity 11 is formed along a length direction of the housing 1, the mounting hole 12 is of a through-hole structure, the mounting hole 12 is formed at a top of the housing 1 and communicated with the mounting cavity 11, and the mounting hole 12 is configured to mount the cleaning head 3.

Further, the transmission assembly 2 is configured to transmit a force from the drive mechanism 200 of the electric toothbrush to the cleaning head 3 to achieve rotation of the cleaning head 3. One end of the first transmission rod 21 is connected to the drive mechanism 200 of the electric toothbrush, so that the drive mechanism 200 drives the first transmission rod 21 to reciprocate along a length direction of the mounting cavity 11. The second transmission rod 22 and the third transmission rod 23 are rotatably connected to one end of the first transmission rod 21 away from the drive mechanism 200 through a rotating shaft 24, wherein the rotating shaft 24 includes but is not limited to a screw, a pin, a rivet and other structures, shaft holes for the rotating shaft 24 to penetrate through are respectively formed between the first transmission rod 21, the second transmission rod 22 and the third transmission rod 23, when the first transmission rod 21, the second transmission rod 22 and the third transmission rod 23 are hinged, the shaft holes on the transmission rods are coaxially arranged, the first transmission rod 21, the second transmission rod 22 and the third transmission rod 23 are movably connected by sequentially penetrating the rotating shaft 24 through the shaft holes of the transmission rods, and the first transmission rod 21, the second transmission rod 22 and the third transmission rod 23 can rotate around the rotating shaft 24.

Furthermore, the cleaning head 3 is of a block structure with bristles 32, and the cleaning head 3 is connected to the second transmission rod 22 and is driven to rotate when the second transmission rod 22 moves eccentrically. The second transmission rod 22 and the third transmission rod 23 are rotatably connected to one end of the first transmission rod 21 away from the drive mechanism 200 through a rotating shaft 24, so that in the up-and-down movement of the first transmission rod 21, the second transmission rod 22 also synchronously moves up and down and rotates around the rotating shaft 24, thereby driving the cleaning head 3 connected to the other end of the second transmission rod 22 to rotate. Meanwhile, one end of the third transmission rod 23 also rotates around the rotating shaft 22, since one end of the third transmission rod 23 away from the rotating shaft 22 is hinged to an inner wall of the mounting cavity 11, the third transmission rod 23 is still limited to the inner wall of the mounting cavity 11 when swinging due to the force applied by the first transmission rod 21, and in this case, the third transmission rod 23 provides a pulling force to the second transmission rod 22, which ensures the second transmission rod 22 keeps stably stressed in the movement process, and prevents the second transmission rod 22 from greatly deviating from a track in the high-speed movement of the transmission assembly 2, causing uneven power transmission to the cleaning head 3 and affecting the cleaning effect and user experience.

In this embodiment, a mounting seat 33 protrudes from one side of the cleaning head 3 away from the bristles 32, and the mounting seat 33 is mounted in the mounting cavity 11 and connected to the second transmission rod 22 of the transmission assembly 2. In the reciprocating motion of the first transmission rod 21 along a length direction of an inner cavity, the second transmission rod 22 and the third transmission rod 23 synchronously move, and meanwhile the second transmission rod 22 swings towards two sides under the action of the rotating shaft 24 to drive the cleaning head 3 at the other end of the second transmission rod 22 to rotate. In addition, one end of the third transmission rod 23 is constrained in the mounting cavity 11, and when one end of the third transmission rod connected to the rotating shaft 24 moves along with the first transmission rod, the other end of the third transmission rod provides a pulling force for the second transmission rod 22, which ensures the second transmission rod 22 keeps stably stressed in the movement process, and prevents the second transmission rod 22 from greatly deviating from a track in the high-speed movement of the transmission assembly 2, causing uneven power transmission to the cleaning head 3.

Referring to FIGS. 2 to 10, in an embodiment, an inner wall of the mounting cavity 11 is provided with a first limiting post 4, and an end portion of the third transmission rod is provided with a first fixed hole 231 rotatably mounted with the first limiting post 4. The housing 1 and the first limiting post 4 may be of an integrally formed structure, and an assembling position may also be provided in the mounting cavity 11 to fix the first limiting post 4. Meanwhile, a first fixed hole 231 is formed in an end portion of the third transmission rod 23, the first fixed hole 231 is a through hole, the third transmission rod 23 and the first limiting post 4 are rotatably connected in a shaft hole fitting manner, the first limiting post 4 is configured to ensure that the third transmission rod 23 is limited at a specific position, a connecting structure is provided between the third transmission rod 23 and the housing 1, and meanwhile, the first limiting post 4 is used to achieve hinging of the third transmission rod 23, which improves the structural rotation strength, so that the rotation process of the entire structure is more stable, and the entire structure can bear stress of the transmission assembly 2 in the movement process.

Referring to FIGS. 4 to 10, in an embodiment, one end of the second transmission rod 22 is provided with a second limiting post 5, and the second limiting post 5 is positioned in the first rotating groove 331. The second limiting post 5 may be fixedly connected to the second transmission rod 22, and one end of the second limiting post 5 away from the second transmission rod 22 is rotatably arranged in the first rotating groove 331. In an optional embodiment, the second limiting post 5 may also be rotatably connected to the second transmission rod 22, so that the force transmission between the second transmission rod 22 and the cleaning head 3 is smoother. The second limiting post 5 is used as a connection structure between the second transmission rod 22 and the cleaning head 3, and is configured to transmit the force of the second limit rod moving up and down and swinging towards two sides to the cleaning head 3, so as to rotate the cleaning head 3.

Referring to FIGS. 4 to 10, in an embodiment, the inner wall of the mounting cavity 11 is further provided with a third limiting post 6, a second rotating groove 332 rotatably connected to the third limiting post 6 is formed in the bottom of the cleaning head 3, and the second rotating groove 332 is positioned at a rotation center of the cleaning head 3. The third limiting post 6 is arranged between the cleaning head 3 and the mounting cavity 11 to serve as a structure for achieving rotary connection, which further limits the movement range of the cleaning head 3, the movement track of the cleaning head 3 is adjusted to move in an arc around the third limiting post 6, and since the cleaning head 3 is limited in the mounting cavity 11 by the third limiting column 6, when the second transmission rod 22 moves to drive the cleaning head 3 to move, the cleaning head 3 will not deviate from the movement track, so that the rotation stability of the cleaning head 3 is further improved. In addition, since the third limiting post 6 is positioned at the rotation center, when the second transmission rod 22 swings, the movement track of the second transmission rod is blocked by the third limiting post 6, and the second transmission rod 22 can only drive the cleaning head 3 to rotate in an amplitude of about 30° in a reciprocating manner, so that the rotation stability of the cleaning head 3 is improved.

Referring to FIGS. 4 to 8, in an embodiment, the first transmission rod 21 is provided with a movable portion 211, the movable portion 211 is provided with a movable groove 212, the second transmission rod 22 is inserted into the movable groove 212, and the third transmission rod 23 is arranged outside the movable portion 211. In an example, two side plates are convexly arranged at one end of the movable portion 211, the movable groove 212 is formed between the two side plates, a through hole is formed in each of the two side plates, the two through holes are both communicated with the movable groove 212, through holes for the rotating shaft 24 to penetrate through are formed in two sides of the movable groove 212, the second transmission rod 22 is arranged in the movable groove 212 through the rotating shaft 24, and meanwhile, one end that is of the rotating shaft 24 and that is far away from a connection with the second transmission rod 22 extends out of the movable groove 212 to connect to the third transmission rod 23 outside the movable portion 211. In another optional embodiment, the movable groove 212 may not be provided, and only a through hole is formed on the movable portion 211, and the rotating shaft 24 penetrates through the through hole and extends out from two sides, so as to rotatably connect two ends of the rotating shaft 24 to the second transmission rod 22 and the third transmission rod 23 respectively. The design of the movable groove 212 improves the stability of the second transmission rod 22, and the second transmission rod 22 is limited in the movable groove 212 to avoid shaking towards a direction perpendicular to the movement track in the movement process, which affects the stability of the entire movement. Meanwhile, the second transmission rod 22 and the third transmission rod 23 are arranged at an inner side and an outer side of the movable portion 211 respectively, so that the second transmission rod and the third transmission rod are prevented from structural interference in the movement process.

Referring to FIGS. 4 to 10, in an embodiment, two opposite sides of the movable portion 211 are provided with first shaft holes 218, one end of the second transmission rod 22 far away from the second limiting post 5 is provided with a second shaft hole 221, one end of the third transmission rod 23 far away from the first limiting post 4 is provided with a third shaft hole 232, and the rotating shaft 24 penetrates through the first shaft holes 218, the second shaft hole 221 and the third shaft hole 232. Specifically, the first shaft hole 218, the second shaft hole 221 and the third shaft hole 232 are all of through hole structures, in the assembling process, the second transmission rod 22 is placed into the movable groove 212, the third transmission rod 23 is lapped on the outer side of the movable portion 211, the first shaft hole 218, the second shaft hole 221 and the third shaft hole 232 are butted through fine position adjustment to ensure that the first transmission rod 21, the second transmission rod 22 and the third transmission rod 23 are placed at corresponding positions, and then the rotating shaft 24 movably penetrates through the first shaft hole 218, the second shaft hole 221 and the third shaft hole 232, and therefore movable connection among the three transmission rods is achieved. Further, the first shaft hole 218, the second shaft hole 221 and the third shaft hole 232 are all arranged on end portions of the corresponding structures, so that energy loss in the transmission process is reduced, and the efficiency of force transmission is improved.

Referring to FIGS. 4 to 8, in an embodiment, the first transmission rod 21 comprises a first push rod 213 and a second push rod 214 fixedly connected to the first push rod 213, one end of the second push rod 214 far away from the first push rod 213 is rotatably connected to the second transmission rod 22 and the third transmission rod 23, and an included angle between the first push rod 213 and the second push rod 214 is an obtuse angle. The first push rod 213 and the second push rod 214 may be of an integrally formed structure, so that the first push rod 213 and the second push rod 214 can work cooperatively when the first transmission rod 21 moves, and one end of the second push rod 214 away from the first push rod 213 extends to form the movable portion 211 to connect to the second transmission rod 22 and the third transmission rod 23, so that force transmission and rotation are achieved. The obtuse angle between the first push rod 213 and the second push rod 214 helps to adjust the angle and output size of the force transmitted from the first transmission rod 21 to the second transmission rod 22.

Referring to FIGS. 4 to 8, in an embodiment, an included angle between the second push rod 214 and the third transmission rod 23 is greater than an included angle between the second transmission rod 22 and the third transmission rod 23. In a specific implementation, a range of the included angle between the third transmission rod 23 and the second push rod 214 and the second transmission rod 22 can be adjusted by changing the mounting position of the third transmission rod 23. In an example, an included angle formed between the second push rod 214 and the third transmission rod 23 in the figure is 130°, an included angle formed between the second transmission rod 22 and the third transmission rod 23 is 70°, in the swing process of the second transmission rod 22, the two included angles are gradually reduced, and the included angle between the second push rod 214 and the third transmission rod 23 is always greater than the included angle between the second transmission rod 22 and the third transmission rod 23. Due to the larger included angle between the second push rod 214 and the third transmission rod 23, a larger moment is generated when the first transmission rod 21 moves upwards, thereby improving the movement efficiency of the second transmission rod 22.

Referring to FIGS. 4 to 8, in another embodiment, an included angle between the second push rod 214 and the third transmission rod 23 is less than an included angle between the second transmission rod 22 and the third transmission rod 23. In an example, the included angle formed between the second push rod 214 and the third transmission rod 23 is 90°, and the included angle formed between the second transmission rod 22 and the third transmission rod 23 is 110°. Since the included angle between the second transmission rod 22 and the third transmission rod 23 is larger, a lever force between the third transmission rod 23 and the second transmission rod 22 is increased when the first transmission rod 21 moves upwards, and then the pulling force effect of the third transmission rod 23 is improved, so that the entire movement is more stable.

Referring to FIGS. 2 to 7, in an embodiment, the cleaning head 3 comprises a rotating base 31 and bristles 32 arranged on the rotating base 31, the rotating base 31 is rotatably mounted in the mounting cavity 11, the bristle 32 is arranged on one side of the rotating base 31 away from the mounting cavity 11, the rotating base 31 is convexly provided with a mounting seat 33, an avoidance groove 333 is formed in an eccentric position of the mounting seat 33, and the first rotating groove 331 is formed on an inner wall of the avoidance groove 333. The mounting seat 33 protrudes from one side of the rotating base 31 away from the bristles 32, and a radius of the mounting seat 33 is less than that of the rotating base 31. The purpose of the avoidance groove 333 formed at the eccentric position is to reserve enough space on the rotation track of the rotating base 31 to prevent the rotating base 31 and the second transmission rod 22 from structural interference in the movement process.

Referring to FIGS. 4 to 10, in an embodiment, the electric toothbrush head 100 further comprises a limiting bolt 7, the housing 1 is provided with a second fixed hole 15, a side wall of the mounting seat 33 is provided with a limiting groove 334, and the limiting bolt 7 extends into the limiting groove 334 from the second fixed hole 15. Specifically, the limiting groove 334 is an arc-shaped groove formed along the movement track of the cleaning head 3, and the limiting bolt 7 is perpendicular to the third limiting post 6. In an example, an assembly process of the cleaning head 3 is provided, after the cleaning head 3 is mounted into the mounting cavity 11 from the mounting hole 12 and connected to the second transmission rod 22, the limiting bolt 7 is inserted into the limiting groove 334 through the second fixed hole 15, and the end portion of the limiting bolt is fixed in the second fixed hole 15; in this case, an inner sidewall of the limiting groove 334 is limited by the limiting bolt 7, so as to avoid shaking in a direction perpendicular to the rotation track, so that the assembly stability of the cleaning head 3 is improved, and the rotation stability of the cleaning head 3 is further improved.

Referring to FIGS. 2 to 6, in an embodiment, the electric toothbrush head 100 further comprises a shock absorbing pad 111, the shock absorbing pad 111 is arranged in the mounting cavity 11, and a top of the shock absorbing pad 111 abuts against an outer wall of the second transmission rod 22.

Specifically, since the second transmission rod 22 requires a certain moving space to normally swing, the second transmission rod is suspended in the mounting cavity 11; however, since a certain space is reserved between the second transmission rod 22 and the inner wall of the mounting cavity 11, when the second transmission rod 22 drives the cleaning head 3 to rotate along an arc-shaped track, the second transmission rod 22 can swing in a direction perpendicular to the rotation direction, which causes the cleaning head 3 to vibrate. The shock absorbing pad 111 is made of a flexible material, including but not limited to rubber and silica gel, which not only fills a space gap between the second transmission rod 22 and the mounting cavity 11, but also avoids generating excessive interference on the movement of the second transmission rod 22, thereby further playing a certain shock absorption role.

Further, the inner wall of the mounting cavity 11 is further provided with an accommodating groove 113 for accommodating the shock absorbing pad 111. A shape and a size of the accommodating groove 113 are adapted to those of the shock absorbing pad 111, which ensures that the shock absorbing pad 111 can be stably placed at the bottom of the mounting cavity 11, and will not shift or fall off during use, thereby improving the stability of the cleaning head 3.

Figure 5:
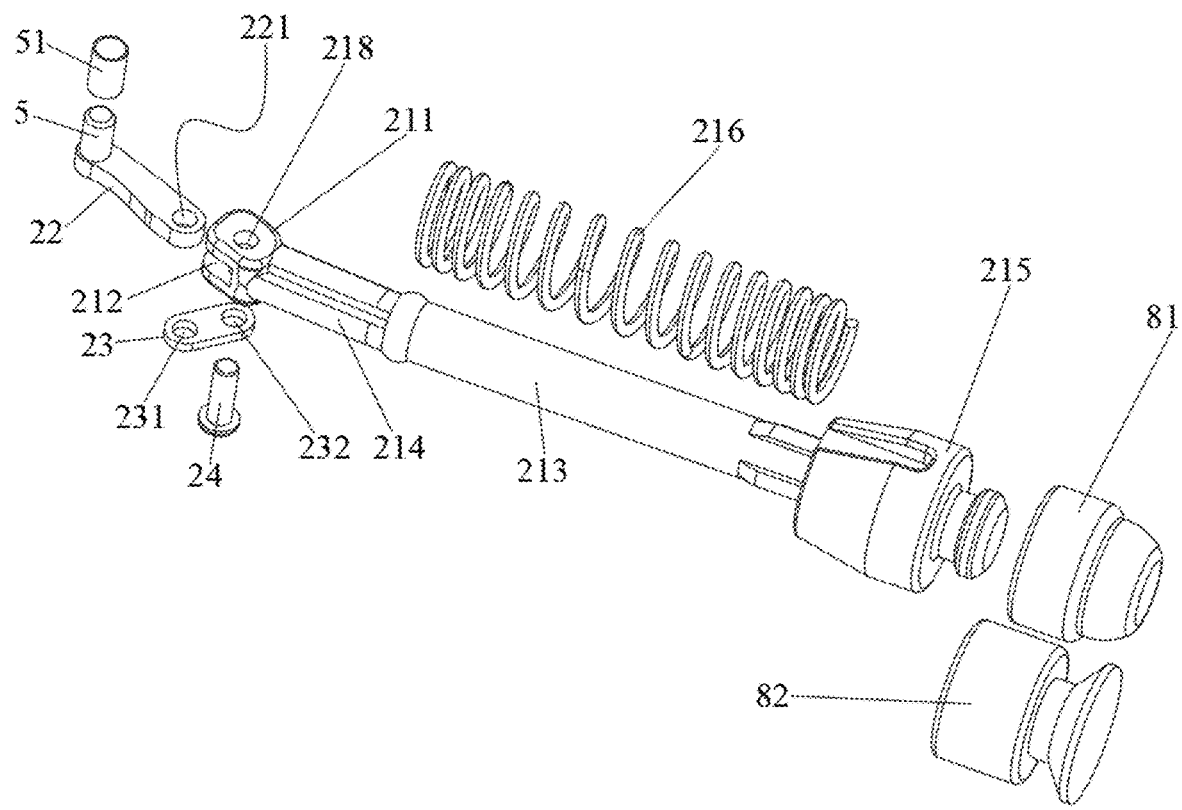
FIG. 5 is a schematic diagram of an exploded structure of a transmission assembly according to an embodiment of the present invention.
Figure 6:
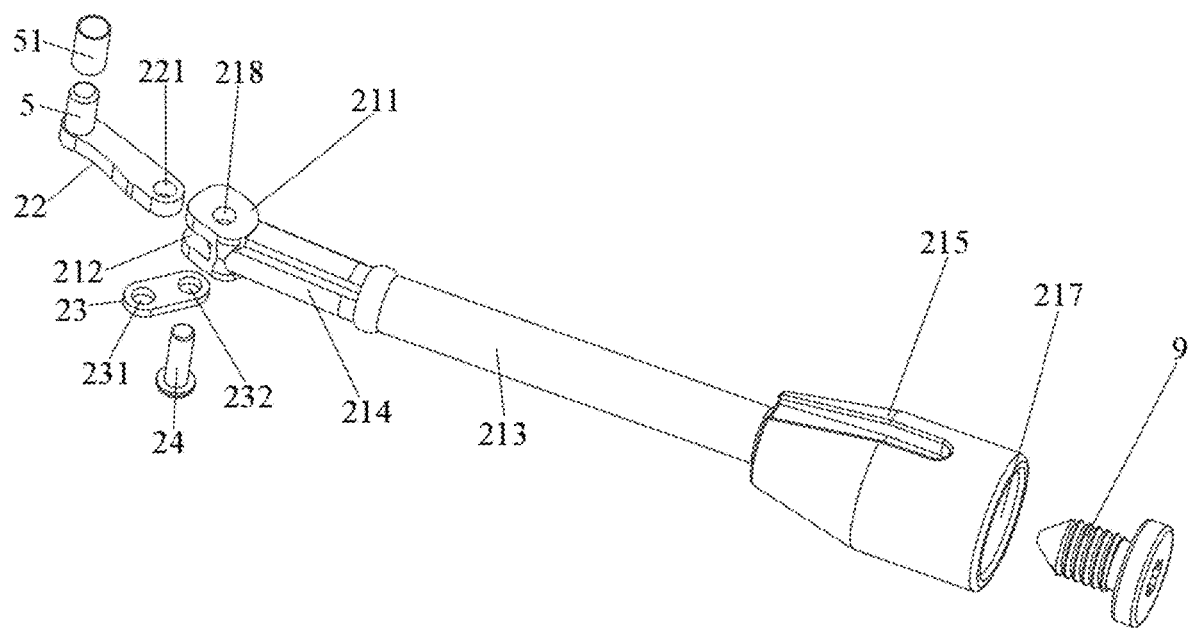
FIG. 6 is a schematic diagram of an exploded structure of a transmission assembly according to another embodiment of the present invention.
Figure 7:
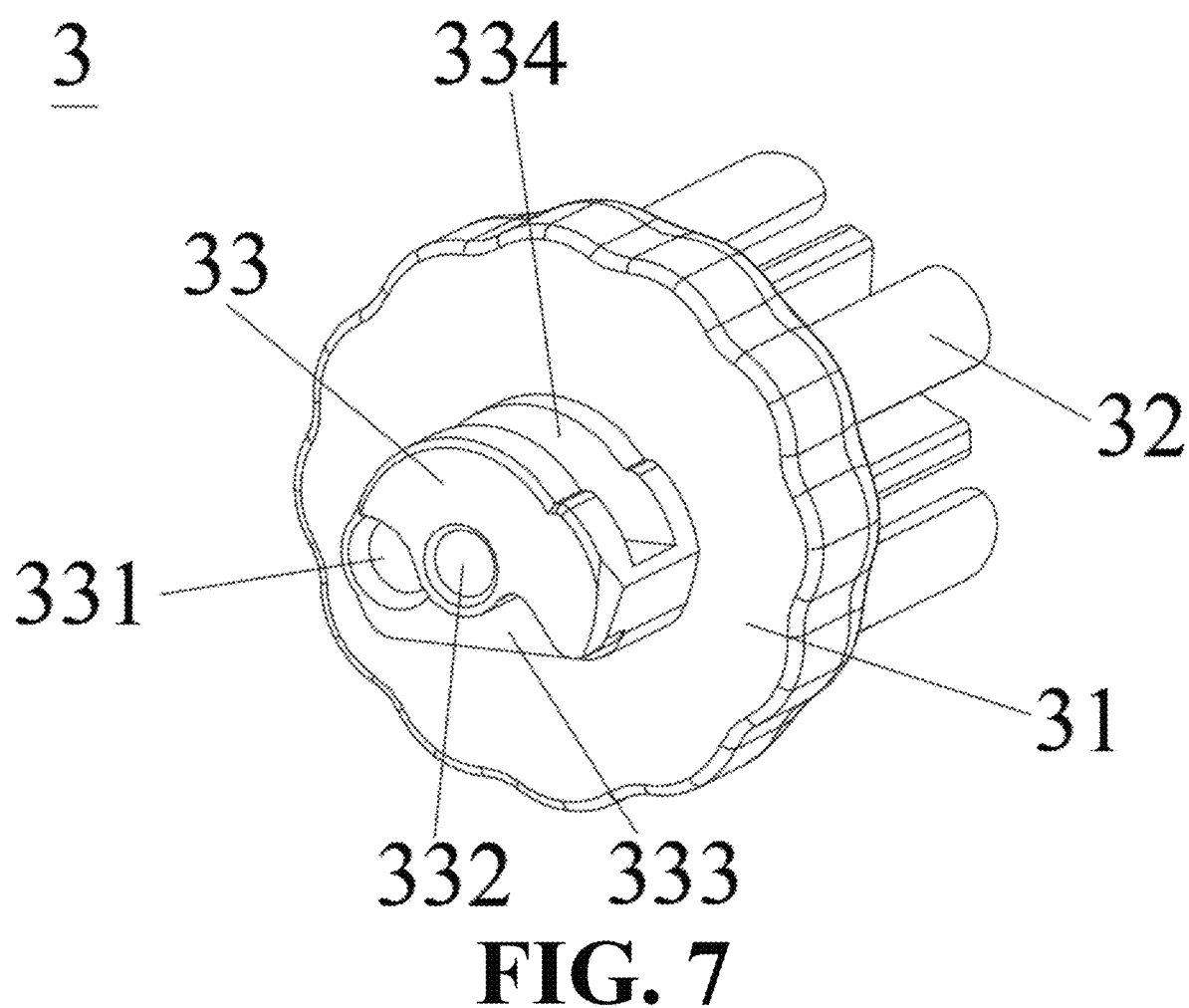
FIG. 7 is a schematic diagram of an overall structure of a cleaning head according to an embodiment of the present invention.
Figure 8:
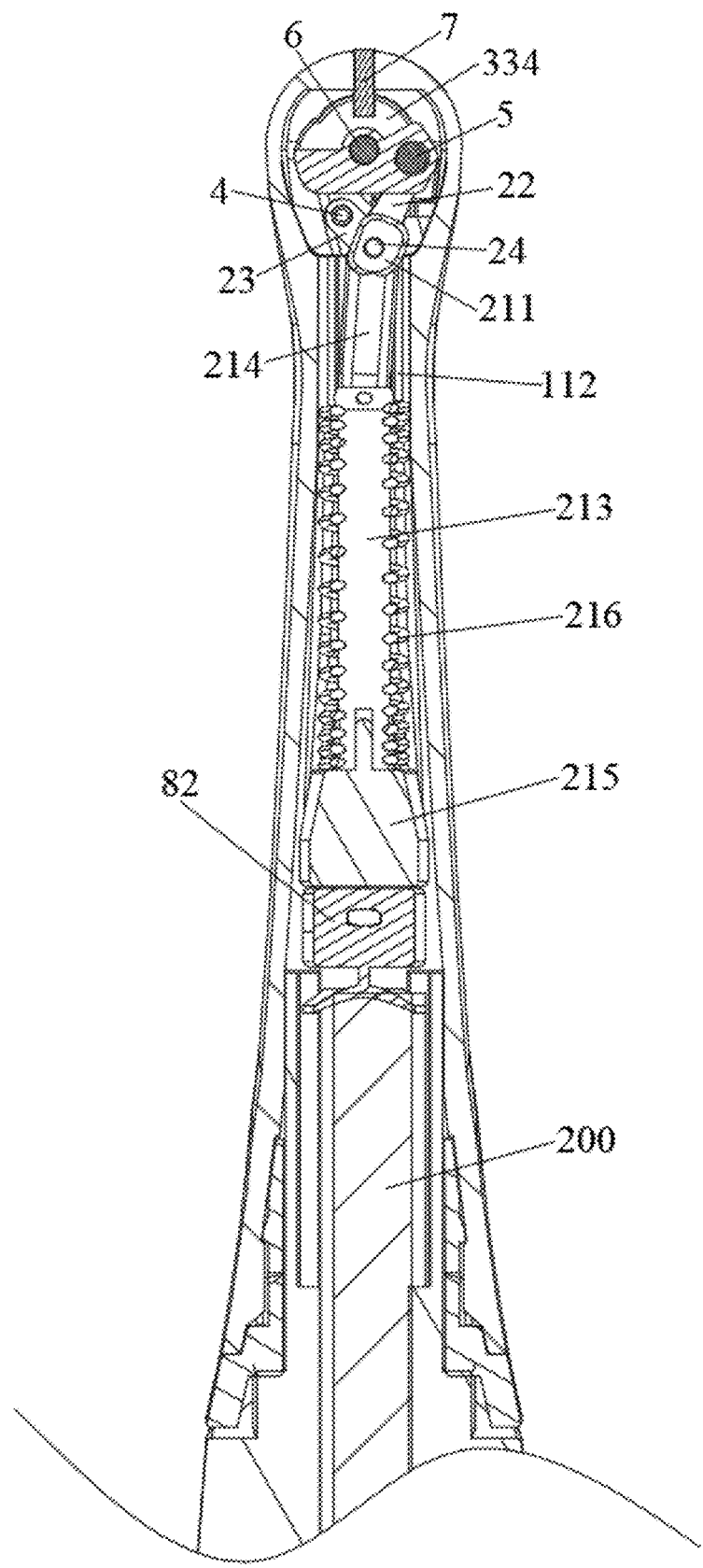
FIG. 8 is a schematic diagram of a cross-sectional structure of an electric toothbrush head according to an embodiment of the present invention.
Figure 9:
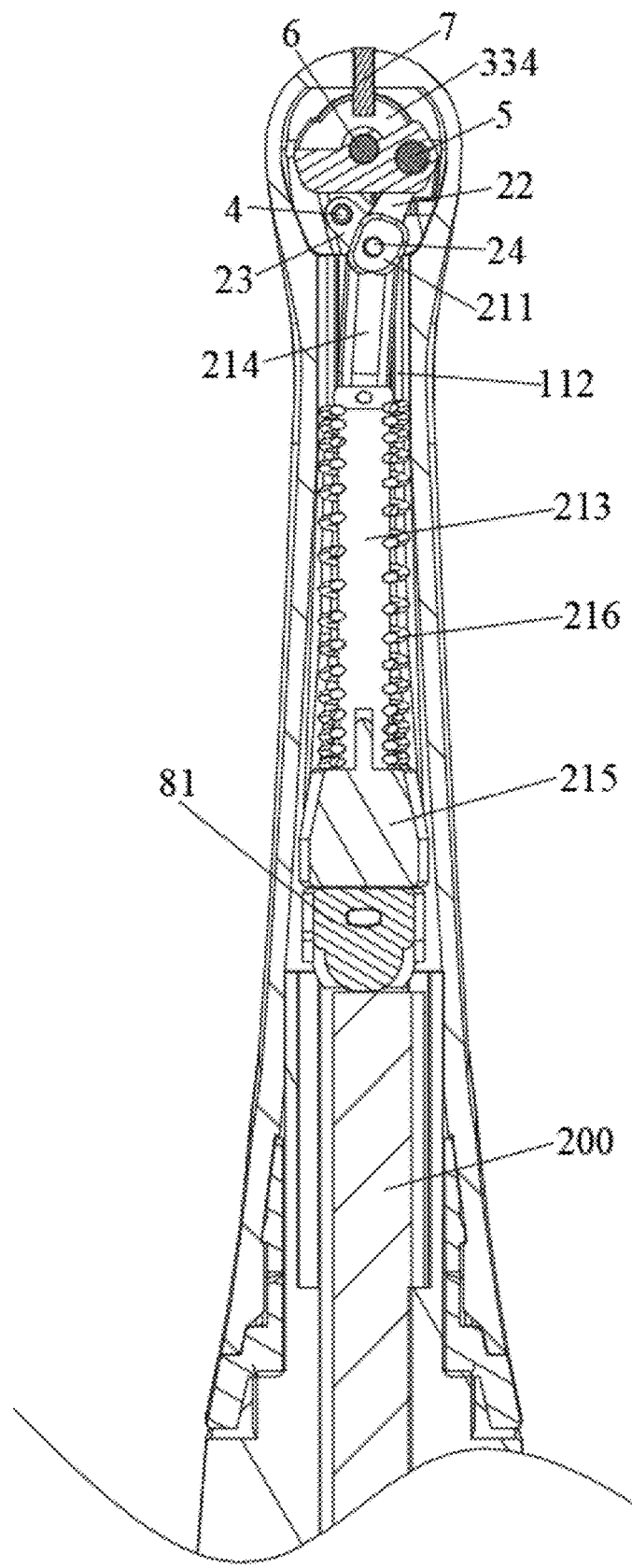
FIG. 9 is a schematic diagram of a cross-sectional structure of an electric toothbrush head according to another embodiment of the present invention.
Figure 10:
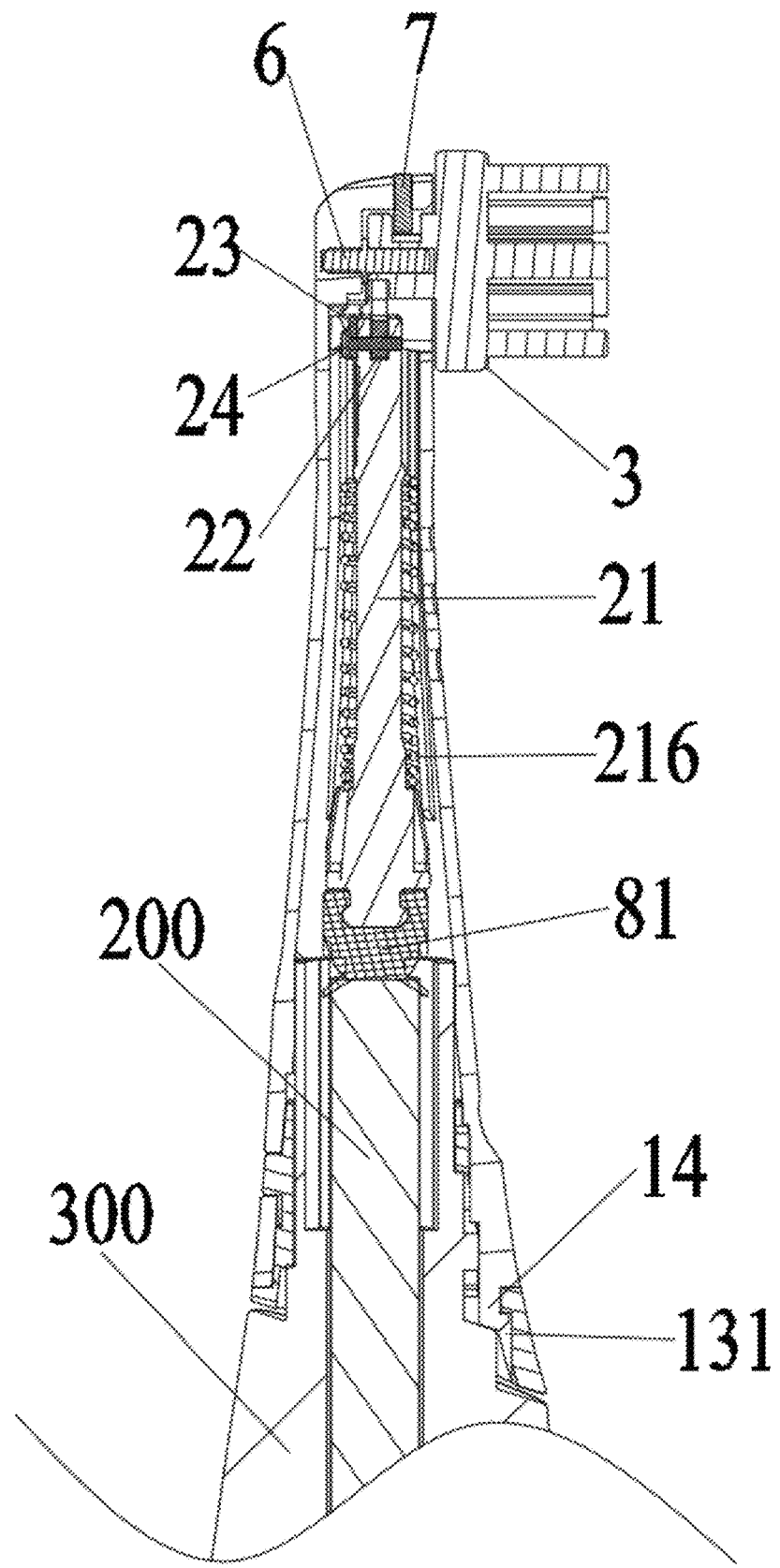
FIG. 10 is a schematic diagram of a cross-sectional structure of an electric toothbrush head according to an embodiment of the present invention from another angle.

Referring to FIGS. 5 to 6, in an embodiment, a metal sleeve 51 is sleeved on the second limiting post 5. In this embodiment, the second limiting post 5 is fixedly connected to the second transmission rod 22, and one end of the second limiting post 5 away from the second transmission rod 22 is rotatably arranged in the first rotating groove 331. The metal sleeve 51 is movably sleeved on the second limiting post 5, and the transmission efficiency of force between the second limiting rod and the cleaning head 3 is improved through the engagement of the metal sleeve 51 and the first rotating groove 331, so that the second limiting rod rotates in the first rotating groove 331 more smoothly.

Referring to FIGS. 2 to 10, in an embodiment, the first transmission rod 21 is further provided with a connecting member 8, one end of the first transmission rod 21 far away from the second transmission rod 22 is provided with a connecting seat 215, and the connecting seat 215 is configured to mount the connecting member 8.

Specifically, the connecting member 8 is configured to connect to a drive end of the drive mechanism 200, so as to transmit the force of the drive mechanism 200 along an axial direction of the electric toothbrush head 100 to the transmission assembly 2. When the drive mechanism 200 is driven by a motor, the connecting member 8 receives a pushing force from the drive mechanism 200 and transmits the pushing force to the transmission assembly 2, which makes the transmission assembly reciprocate up and down, so that the cleaning head 3 is driven to rotate under the action of the transmission assembly 2, and the cleaning effect is achieved.

Further, the connecting member 8 and the connecting base 215 may be connected by using a protrusion 219 and a groove 83, a buckle position and a groove 83, or other manners. In a preferred embodiment, the connecting base 215 is provided with a protrusion 219, the protrusion 219 is provided with an annular buckle position, and the connecting member 8 is provided with a groove 83 engaged with the protrusion 219; and through the flexibility of the connecting member 8, the protrusion 219 is pushed into the groove 83, and the buckle position is engaged with a limiting structure on a periphery of the groove 83 to achieve clamping.

Furthermore, the connecting member 8 is made of a flexible material and has good elasticity and deformability. When the connecting member 8 is impacted or vibrated by the drive mechanism 200, the material of the connecting member can be elastically deformed to absorb and disperse energy from the vibration or the impact, so that the vibration transmitted to the connecting member 8 and the transmission assembly 2 connected to the connecting member is reduced, and the movement stability of the cleaning head 3 is further improved.

Referring to FIGS. 2 to 8, in an embodiment, a spring 216 is sleeved on an outer side of the first transmission rod 21, the mounting cavity 11 is provided with a spring seat 112, and the spring 216 is positioned between the spring seat 112 and the connecting seat 215. When the connecting member 8 receives the pushing force from the drive mechanism 200, the first transmission rod 21 moves linearly in a direction of the cleaning head 3, and the spring 216 is compressed in a direction of the spring seat 112; and when the drive mechanism 200 stops providing power, the spring 216 releases the pressure to recover, and drives the first transmission rod 21 to move linearly in a direction away from the cleaning head 3.

Referring to FIGS. 2 to 8, in an embodiment, the connecting member 8 comprises a soft rubber suction disk 82, and an end portion of a soft rubber ball disk 81 is provided with a suction disk portion connected to an end portion of a drive assembly. The soft rubber suction disk 82 is made of a flexible material including but not limited to rubber or silica gel, a surface of which has adsorption capacity, so that the soft rubber suction disk can be firmly attached to the smooth surface; and a connecting handle 300 is arranged at a drive end of the drive mechanism 200, and the soft rubber suction disk 82 applies pressure to the bottom of the connecting member 8, so that negative pressure is generated between the soft rubber suction disk and the surface, and stable fixing is achieved. In addition, since the soft rubber suction disk 82 is made of a flexible material, the soft rubber suction disk has good wear resistance and durability in the power transmission process, and can keep stable performance in long-term use.

Referring to FIGS. 2 to 8, in an embodiment, the connecting member 8 comprises a soft rubber ball disk 81, and an end portion of the soft rubber ball disk 81 is provided with an ellipsoid portion connected to an end portion of a drive assembly. The soft rubber ball disk 81 is of a hemispherical structure, which can provide flexible connection in multiple directions and is configured to connect the drive end of the drive mechanism 200 with an irregular or curved surface, and thus having strong adaptability and stability. In addition, an elastic force of the spring 216 abuts against the first transmission rod 21, which ensures that tight connection is kept between the connecting member 8 and the drive end of the drive mechanism 200, and prevents the unstable connection between the first transmission rod 21 and the drive mechanism 200 from affecting the transmission efficiency and uniformity of the force, thereby causing unstable rotation of the electric toothbrush head 100.

Referring to FIGS. 2 to 9, in an embodiment, the transmission assembly 2 further comprises a magnetic member 9, the magnetic member 9 is fixedly arranged at one end of the first transmission rod 21 far away from the second transmission rod 22, and the magnetic member 9 is magnetically attracted to a drive shaft of the electric toothbrush. The magnetic member 9 is configured to generate magnetic attraction with the drive end of the drive mechanism 200 and drive the transmission assembly 2 by magnetic force to achieve reciprocating linear motion. The drive mechanism 200 based on magnetic principle in the electric toothbrush is a mature technology in the field. Details are not described herein.

Referring to FIGS. 2 to 9, in an embodiment, the magnetic member 9 is a screw, and the first transmission rod 21 is provided with a screw hole 217 adapted to the screw. The screw hole 217 is internally provided with an internal thread adapted to the screw, the magnetic member 9 is configured in the form of a screw, which ensures a stable mounting of the magnetic member 9. Since the screw is a common fixing member, mounting and replacement are simpler, and assembly efficiency is improved.

Referring to FIGS. 2 to 10, in an embodiment, one end of the housing 1 away from the cleaning head is provided with a tail hood 13, an outer side of the housing 1 is provided with a bendable buckle 14, and the tail hood 13 is provided with a clamping groove engaged and clamped with the buckle 14.

Specifically, the tail hood 13 serves as a direct connection assembly between the housing 1 and the handle 300, the tail hood 13 is provided with structures connected to the housing 1 and the handle 300, and after the tail hood 13 is detachably mounted at the bottom of the housing 1, and then through the direct connection structure between the tail hood 13 and the handle 300, the housing 1 of the electric toothbrush head 100 is mounted on the electric toothbrush.

Further, the tail hood 13 is provided with an inserting portion with a diameter less than that of the mounting cavity 11, and the inserting portion is arranged in the mounting cavity 11 in a penetrating manner to enable the tail hood 13 to be in butt joint with the housing 1. In addition, an opened clamping groove is further formed in the tail hood 13, the design of the buckle 14 and the clamping groove 131 enable the design of the housing 1 to have certain flexibility, in the pushing-in process, since the buckle 14 can be bent, the buckle 14 can be pressed up by an inner wall of the tail hood 13 until the buckle 14 moves to the clamping groove 131, in this case, the tail hood 13 and the housing 1 are fixed through the clamping between the buckle 14 and the clamping groove 131, when the tail hood 13 needs to be detached, the buckle 14 is pressed, and the tail hood 13 can be pulled out, so that the detaching and mounting are convenient.

Figure 11:
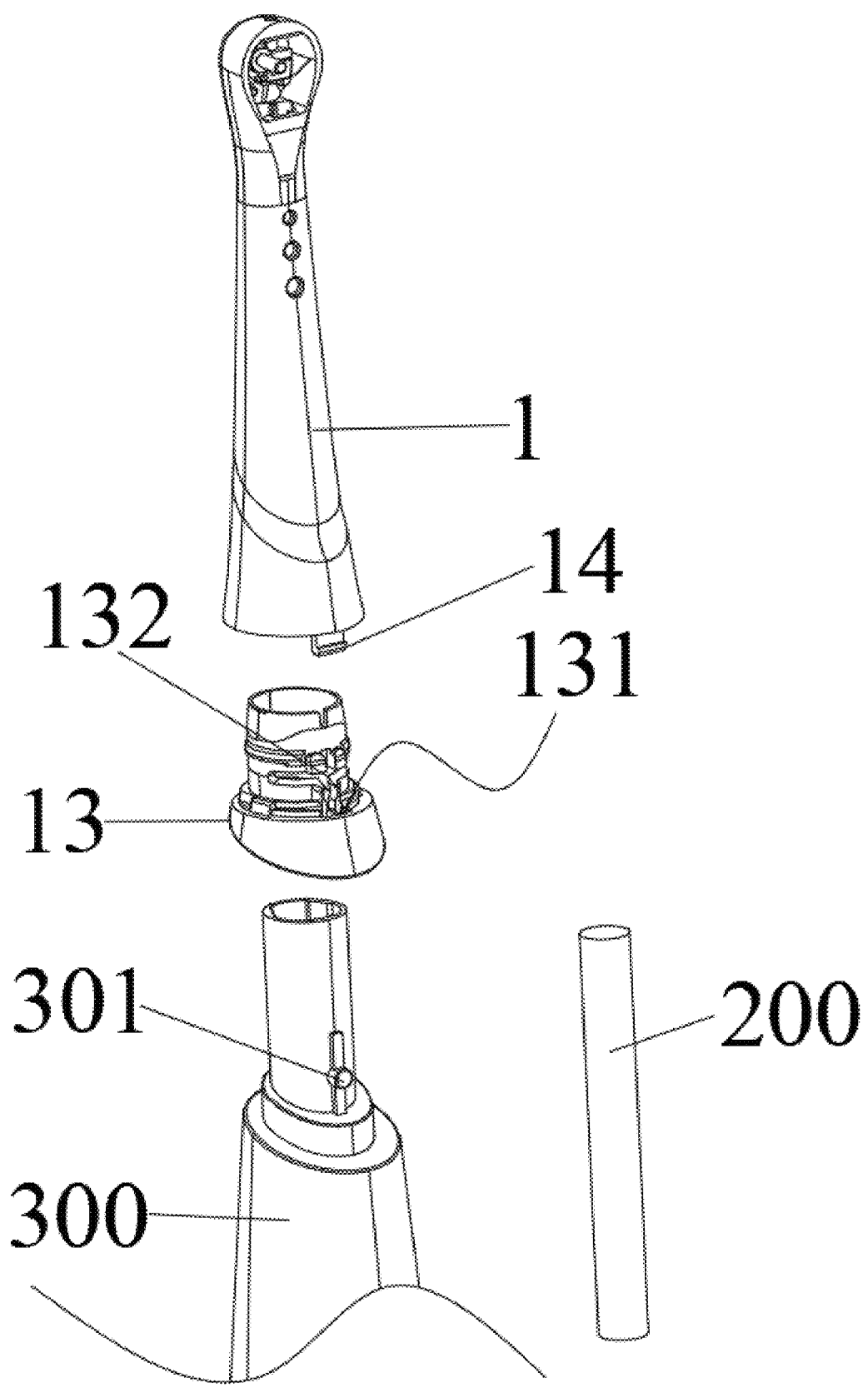
FIG. 11 is a schematic diagram of another exploded structure of an electric toothbrush according to an embodiment of the present invention.

Furthermore, mutually engaging connection structures are provided between the tail hood 13 and the handle 300 at the bottom of the electric toothbrush. Referring to FIG. 11, in an example, the tail hood 13 is provided with a circular clamping hole 132, and a circular clamping protrusion 301 protrudes from the handle 300.

The above mentioned contents are only optional embodiments of the present invention and are not intended to limit the patent scope of the present invention, and under the inventive concept of the present invention, the equivalent structural transformations made by using the contents of the specification and the drawings of the present invention, or direct/indirect applications to other related technical fields, are all included in the patent protection scope of the present invention.

What is claimed is:

1. An electric toothbrush head, comprising:
a housing (1), wherein the housing (1) is provided with a mounting cavity (11) and a mounting hole (12) communicated with the mounting cavity (11);
a transmission assembly (2), wherein the transmission assembly (2) is arranged in the mounting cavity (11), the transmission assembly (2) comprises a first transmission rod (21), a second transmission rod (22) and a third transmission rod (23), one end of a rotating shaft (24) passes through one end of the first transmission rod (21), one end of the second transmission rod (22) and one end of the third transmission rod (23), such that the first transmission rod (21), the second transmission rod (22) and the third transmission rod (23) are rotatably connected; and an other end of the third transmission rod (23) is hinged in the mounting cavity (11); and
a cleaning head (3), wherein the cleaning head (3) is rotatably mounted in the mounting cavity (11) from the mounting hole (12), a bottom of the cleaning head (3) is eccentrically provided with a first rotating groove (331), and an other end of the second transmission rod (22) is arranged in the first rotating groove (331).

2. The electric toothbrush head according to claim 1, wherein an inner wall of the mounting cavity (11) is provided with a first limiting post (4), and an end portion of the third transmission rod is provided with a first fixed hole (231) engaged with the first limiting post (4).

3. The electric toothbrush head according to claim 2, wherein the second transmission rod (22) is provided with a second limiting post (5), and the second limiting post (5) is positioned in the first rotating groove (331).

4. The electric toothbrush head according to claim 3, wherein the inner wall of the mounting cavity (11) is further provided with a third limiting post (6), a second rotating groove (332) rotatably connected to the third limiting post (6) is formed in the bottom of the cleaning head (3), and the second rotating groove (332) is positioned at a rotation center of the cleaning head (3).

5. The electric toothbrush head according to claim 4, wherein the first transmission rod (21) is provided with a movable portion (211), the movable portion (211) is provided with a movable groove (212), the second transmission rod (22) is inserted into the movable groove (212), and the third transmission rod (23) is arranged outside the movable portion (211).

6. The electric toothbrush head according to claim 5, wherein two opposite sides of the movable portion (211) are provided with first shaft holes (218), one end of the second transmission rod (22) far away from the second limiting post (5) is provided with a second shaft hole (221), one end of the third transmission rod (23) far away from the first limiting post (4) is provided with a third shaft hole (232), and the rotating shaft (24) penetrates through the first shaft holes (218), the second shaft hole (221) and the third shaft hole (232).

7. The electric toothbrush head according to claim 1, wherein the first transmission rod (21) comprises a first push rod (213) and a second push rod (214) fixedly connected to the first push rod (213), one end of the second push rod (214) far away from the first push rod (213) is rotatably connected to the second transmission rod (22) and the third transmission rod (23), and an included angle between the first push rod (213) and the second push rod (214) is an obtuse angle.

8. The electric toothbrush head according to claim 7, wherein an included angle between the second push rod (214) and the third transmission rod (23) is greater than an included angle between the second transmission rod (22) and the third transmission rod (23).

9. The electric toothbrush head according to claim 7, wherein an included angle between the second push rod (214) and the third transmission rod (23) is less than an included angle between the second transmission rod (22) and the third transmission rod (23).

10. The electric toothbrush head according to claim 1, wherein the cleaning head (3) comprises a rotating base (31) and bristles (32) arranged on the rotating base (31), the rotating base (31) is rotatably mounted in the mounting cavity (11), the bristle (32) is arranged on one side of the rotating base (31) away from the mounting cavity (11), the rotating base (31) is convexly provided with a mounting seat (33), an avoidance groove (333) is formed in an eccentric position of the mounting seat (33), and the first rotating groove (331) is formed on an inner wall of the avoidance groove (333).

11. The electric toothbrush head according to claim 10, wherein the electric toothbrush head further comprises a limiting bolt (7), the housing (1) is provided with a second fixed hole (231), a side wall of the mounting seat (33) is provided with a limiting groove (334), and the limiting bolt (7) extends into the limiting groove (334) from the second fixed hole (231).

12. The electric toothbrush head according to claim 1, wherein the electric toothbrush head further comprises a shock absorbing pad (111), the shock absorbing pad (111) is arranged in the mounting cavity (11), and a top of the shock absorbing pad (111) abuts against an outer wall of the second transmission rod (22).

13. The electric toothbrush head according to claim 3, wherein a metal sleeve (51) is sleeved on the second limiting post (5).

14. The electric toothbrush head according to claim 1, wherein a connecting member (8) engaged with a drive shaft of the electric toothbrush is arranged on the first transmission rod (21), one end of the first transmission rod (21) far away from the second transmission rod (22) is provided with a connecting seat (215), and the connecting seat (215) is configured to mount the connecting member (8).

15. The electric toothbrush head according to claim 14, wherein a spring (216) is sleeved on an outer side of the first transmission rod (21), the mounting cavity (11) is provided with a spring seat (112), and the spring (216) is positioned between the spring seat (112) and the connecting seat (215).

16. The electric toothbrush head according to claim 15, wherein the connecting member (8) comprises a soft rubber suction disk (82).

17. The electric toothbrush head according to claim 15, wherein the connecting member (8) comprises a soft rubber ball disk (81).

18. The electric toothbrush head according to claim 1, wherein the transmission assembly (2) further comprises a magnetic member (9) magnetically engaged with the drive shaft of the electric toothbrush, and the magnetic member (9) is fixedly arranged at one end of the first transmission rod (21) far away from the second transmission rod (22).

19. The electric toothbrush head according to claim 18, wherein the magnetic member (9) is a screw, and the first transmission rod (21) is provided with a screw hole (217) adapted to the screw.

20. The electric toothbrush head according to claim 1, wherein the electric toothbrush head further comprises a tail hood (13), and the tail hood (13) is detachably connected to the housing (1).

* * * * *